United States Patent [19]

DeVoe et al.

[11] Patent Number: 4,740,577
[45] Date of Patent: Apr. 26, 1988

[54] ENERGY POLYMERIZABLE POLYURETHANE PRECURSORS

[75] Inventors: Robert J. DeVoe; Doreen C. Lynch, both of St. Paul, Minn.

[73] Assignee: Minnesota Mining and Manufacturing Company, St. Paul, Minn.

[21] Appl. No.: 90,960

[22] Filed: Aug. 28, 1987

[51] Int. Cl.$^4$ ............................................. C08G 18/40
[52] U.S. Cl. ....................................... 528/51; 528/52; 528/56; 528/59; 523/123
[58] Field of Search ..................... 525/123; 528/51, 52, 528/56, 59

[56] References Cited

U.S. PATENT DOCUMENTS

| | | | |
|---|---|---|---|
| 4,369,206 | 1/1983 | Mayer et al. | 427/54.1 |
| 4,521,545 | 6/1985 | Kerimis et al. | 521/107 |
| 4,544,466 | 10/1985 | Lindstrom | 204/159.11 |
| 4,549,945 | 10/1985 | Lindstrom | 204/159.11 |
| 4,582,861 | 4/1986 | Galla et al. | 521/118 |

FOREIGN PATENT DOCUMENTS

| | | |
|---|---|---|
| 28696 | 9/1980 | European Pat. Off. |
| 094914 | 5/1983 | European Pat. Off. |
| 109851 | 11/1983 | European Pat. Off. |

OTHER PUBLICATIONS

C. Hepburn, "Polyurethane Elastomers", Applied Science Publishers, New York, 1982.
T. Speckard et al., Appl. Polymer Science 1985, 30, 647–666.
C. Bluestein, Polym.—Plast. Technol. Eng. 1981, 17, 83–93.

*Primary Examiner*—Maurice J. Welsh
*Assistant Examiner*—S. A. Acquah
*Attorney, Agent, or Firm*—Donald M. Sell; James A. Smith; Lorraine R. Sherman

[57] ABSTRACT

A polymerizable composition of polyurethane precursors is rapidly cured using energy-activated catalysts to provide polyurethanes. The polymerizable composition is comprised of polyisocyanates with polyols, fillers, coating aids, adjuvants, and a latent catalyst. Latent catalysts are ionic salts of organometallic complex cations. The cured polyurethanes are useful as abrasion resistant coatings, protective finishes such as furniture finishes and floor tiles, binders for magnetic media, adhesives, and have various applications in industries which use photoresist technologies such as graphic arts and electronics, and in the paint and ink industries.

25 Claims, No Drawings

ENERGY POLYMERIZABLE POLYURETHANE PRECURSORS

FIELD OF THE INVENTION

This invention relates to a polymerizable composition of polyurethane precursors and a process therefor. In another aspect, coated articles and shaped and layered structures comprising the cured polyurethanes are disclosed.

BACKGROUND OF THE INVENTION

Reaction or curing of polymerizable mixtures of polyisocyanates with polyols (referred to as polyurethane precursors) to form polyurethanes is well known in the art. Curing is facilitated by the addition of catalysts or reaction promoters such as tin salts and tertiary amines (see C. Hepburn, "Polyurethane Elastomers", Applied Science, New York, 1982). Such catalysts or reaction promoters provide almost instantaneous curing of the polyurethane precursors; this is not always desirable, especially when the polyurethane precursors are to be used as a coating. Instead it may be useful to use a latent catalyst or latent reaction promoter which can be activated in a controlled fashion at some time after mixing with the polyurethane precursors.

Thermal curing of polyurethane precursors using thermally latent catalysts is known in the art (see for example U.S. Pat. Nos. 4,521,545, and 4,582,861). Photocuring of polyurethane precursors using compounds capable of generating tertiary amine promoters upon irradiation with ultraviolet light is also known (see U.S. Pat. No. 4,369,206 and European Pat. No. 28,696, (1981) (Derwent Abstract).

Photocuring of urethane (meth)acrylates is also well known (see T. A. Speckhard, K. K. S. Hwang, S. B. Lin, S. Y. Tsay, M. Koshiba, Y. S. Ding, S. L. Cooper J. Appl. Polymer Science 1985, 30, 647–666, and references therein; C. Bluestein Polym.-Plast. Technol. Eng. 1981, 17 83–93). This curing method has many shortcomings: it suffers from sensitivity to oxygen; it necessitates ultraviolet light; and it requires modified resins, i.e., (meth)acrylated polyols and/or (meth)acrylated polyisocyanates, with a corresponding change in the polyurethane properties.

Photocuring of polyurethane precursors to polyurethanes using diazonium salts is known (see U.S. Pat. No. 4,544,466). Photocuring of polyurethane precursors to polyurethanes using organotin compounds is also known (see U.S. Pat. No. 4,549,945).

Organometallic complex cations have been described (see European Patent Nos. 109,851 (1984); 094,915 (1983) (Derwent Abstract); and 094,914 (1983) (Derwent Abstract)). Energy polymerizable compositions comprising ionic salts of organometallic complex cations and cationically sensitive materials and the curing thereof has been taught.

What is not known in the art, but what this invention teaches, is energy polymerizable compositions comprising polyurethane precursors and ionic salts of organometallic complex cations and the curing thereof.

Furthermore, this invention describes energy polymerizable compositions which are more photosensitive than those taught in U.S. Pat. Nos. 4,544,466, and 4,549,945.

SUMMARY OF THE INVENTION

Briefly, the present invention provides a polymerizable mixture comprising polyisocyanates and polyols to provide polyurethanes utilizing as catalyst a cationic compound which is an ionic salt of an organometallic complex cation. It is within the scope of this invention to substitute other isocyanate-reactive compounds bearing at least two isocyanate-reactive groups for the polyols as is know in the art (C. Hepburn, "Polyurethane Elastomers", Applied Science, New York, 1982). By selection of the metal and ligands in the organometallic complex cation and the counterion used, the relative thermal stability and sensitivity to radiation (for example electron beam or light of wavelength range 200–600 nm) can be adapted for various applications.

In accordance with the present invention there are provided energy-polymerizable compositions comprising:
  (a) a polymerizable mixture comprising a polyisocyanate and a polyol, and
  (b) a catalytically-effective amount of an ionic salt of an organometallic complex cation sufficient to effect polymerization, the metal of the organometallic complex cation being selected from elements of Periodic Groups IVB, VB, VIB, VIIB, AND VIIIB.

There is also provided a process for the polymerization of polyurethane precursors comprising the steps of:
  (a) providing a mixture of polyisocyanates and polyols,
  (b) mixing the polyisocyanates, polyols and a catalytically effective amount of the ionic salt of an organometallic complex cation (and all permutations of the order of mixing the aforementioned components) thereby forming a polymerizable mixture, and
  (c) allowing the mixture to polymerize or adding energy to the mixture to effect polymerization.

There is further provided a graphics article which is a layered structure comprising the composition described above in the form of a coating on a substrate which provides for the formation of images.

There is also provided a method for preparing such articles comprising the steps of:
  (a) providing a substrate,
  (b) applying an energy polymerizable mixture as described above to the substrate by methods known in the art, such as bar, knife, reverse roll, knurled roll, or spin coatings, or by dipping, spraying, brushing, and the like, with or without a coating solvent, and
  (c) optionally, allowing solvent to evaporate.

There is further provided a method of forming an image on a substrate comprising the steps of:
  (a) providing a graphics article as described above,
  (b) exposing the graphics article to radiation from an electron beam or light of wavelength 200–600 nm in an imagewise manner such as through a mask, to form a latent image of activated photocatalyst,
  (c) applying energy to the article to cause the polymerization of the coating, and
  (d) removing the unexposed portions of the energy polymerizable coating by rinsing with solvent, optionally with rubbing, to leave a polyurethane coating negative image of the mask.

There is also provided a method of forming an image on a substrate comprising the steps of:

(a) providing a graphics article as described above,
(b) exposing the graphics article to radiation from an electron beam or light of wavelength 200-600 nm in an imagewise manner, such as through a mask, causing the exposed areas to polymerize, and
(c) removing the unexposed portions of the energy polymerizable coating by rinsing with a solvent, optionally with the aid of rubbing action, thereby leaving a polyurethane coating as a negative image of the mask.

As used in this application:

"catalytically-effective amount" means a quantity sufficient to effect polymerization of the polyurethane precursors to a polyurethane at least to a degree to cause an increase in the viscosity of the composition;

"organometallic complex" means a chemical substance in which the carbon atoms of organic groups are bonded to metal atoms ("Basic Inorganic Chemistry", F. A. Cotton, G. Wilkinson, Wiley, New York, 1976, p 497).

"polyurethane precursors" means a polymerizable mixture of one or more monomers of the type including diisocyanates and polyisocyanates, and one or more monomers of the type including diols and polyols. Compounds bearing at least two isocyanate-reactive groups may be substituted for diols and polyols.

"polymerizable mixture" means a mixture where the ratio of (isocyanate groups):(isocyanate-reactive groups) is in the range of 1:2 to 2:1.

"polyisocyanate" means an aliphatic or aromatic isocyanate having 2 or more isocyanate groups;

"polyol" means an aliphatic or aromatic compound containing 2 or more hydroxyl groups; and "photosensitizer" or "photoaccelerator" are terms which are used interchangeably.

DETAILED DESCRIPTION OF THE INVENTION

The ionic salts of organometallic complex cations in the compositions and processes of this invention are compounds having the general formula I:

$$[((L^1)(L^2)M)_b(L^3)(L^4)]^{+e} X_f \qquad \text{I}$$

wherein

M represents a metal atom selected from the elements of Periodic Groups IVB, VB, VIB, VIIB, and VIIIB; with the proviso that formula I represents a mononuclear or binuclear complex;

$L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;

$L^2$ represents none, or 1 to 6 ligands contributing an even number of sigma-electrons that can be the same or different selected from mono-, di-, and tri-dentate ligands, each donating 2, 4, or 6 sigma-electrons to the valence shell of M;

$L^3$ represents none, 1 or 2 bridging ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

$L^4$ represents none, 1, 2, or 3 bridging ligands contributing an even number of sigma-electrons that can be the same or different selected from mono-, di-, and tri-dentate ligands, each donating 2, 4 or 6 sigma-electrons to the valence shells of two metal atoms M, simultaneously; with the proviso that the total electronic charge contributed to M by the ligands $L^1$, $L^2$, $L^3$, and $L^4$ plus the product of the ionic charge on M with b results in a residual positive charge of e to the complex;

b is an integer having a value of 1 or 2;

e is an integer having a value of 1 or 2, the residual electrical charge of the complex cation;

X is an anion selected from organic sulfonate anions and halogen-containing complex anions of a metal or metalloid;

f is an integer of 1 or 2, the number of anions required to neutralize the positive charge e on the complex cation.

In a preferred composition of the invention, the salts of the organometallic complex cation have the formula:

$$[(L^5)(L^6)M]^{+e} X_f \qquad \text{II}$$

wherein

M represents a metal atom selected from elements of the Period Groups IVB, VB, VIB, VIIB, and VIIIB;

$L^5$ represents none, one or two ligands that can be the same or different, contributing pi-electrons selected from the same groups of ligands from which ligand $L^1$ of formula I is selected;

$L^6$ represents none or 1 to 6 ligands that can be the same or different, contributing an even number of sigma-electrons selected from the same group of ligands from which ligand $L^2$ of formula I is selected; with the proviso that the total electronic charge contributed to M by $L^5$ and $L^6$ plus the ionic charge on M results in a residual net positive charge of e to the complex; and e, f, and X have the same definition as given in formula I.

Salts of organometallic complex cations having formulae I and II are radiation sensitive in addition to being thermally sensitive.

Ligands $L^1$ to $L^6$ are well known in the art of transition metal organometallic compounds.

Ligand $L^1$ of general formula I and ligand $L^5$ of general formula II are provided by any monomeric or polymeric compound having an accessible unsaturated group, i.e., an ethylenic,

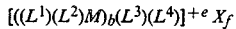

group; acetylenic, —C≡C— group; or aromatic group which have accessible pi-electrons regardless of the total molecular weight of the compound. By "accessible", it is meant that the compound (or precursor compound from which the accessible compound is prepared) bearing the unsaturated group is soluble in a reaction medium, such as an alcohol, e.g., methanol; a ketone, e.g., methyl ethyl ketone; an ester, e.g., amyl acetate; a halocarbon, e.g., trichloroethylene; an alkane, e.g., decalin; an aromatic hydrocarbon, e.g., anisole; an ether, e.g., tetrahydrofuran; etc, or that the compound is divisible into very fine particles of high surface area so that the unsaturated group (including aromatic group) is sufficiently close to a metal atom to form a pi-bond between that unsaturated group and the metal atom. By polymeric compound, is meant, as explained below, that the ligand can be a group on a polymeric chain.

Illustrative of ligands $L^1$ and $L^5$ are the linear and cyclic olefinic and acetylenic compounds having less than 100 carbon atoms, preferably having less than 60 carbon atoms, and from zero to 10 hetero atoms selected from nitrogen, sulfur, non-peroxidic oxygen, phosphorus, arsenic, selenium, boron, antimony, tellurium, silicon, germanium, and tin, such as, for example, ethylene, acetylene, propylene, methylacetylene, 1-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; $eta^3$-allyl, $eta^3$-pentenyl, norbornadiene, $eta^5$-cyclohexadienyl, $eta^6$-cycloheptatriene, $eta^8$-cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorous, arsenic, selenium, boron, antimony, tellurium, silicon, germanium, and tin, such as, for example, $eta^5$-cyclopentadienyl, $eta^6$-benzene, $eta^6$-mesitylene, $eta^6$-hexamethylbenzene, $eta^6$-fluorene, $eta^6$-naphthalene, $eta^6$-anthracene, $eta^6$-chrysene, $eta^6$-pyrene, $eta^7$-cycloheptatrienyl, $eta^6$-triphenylmethane, $eta^{12}$-paracyclophane, $eta^{12}$-1,4-diphenylbutane, $eta^5$-pyrrole, $eta^5$-thiophene, $eta^5$-furan, $eta^6$-pyridine, $eta^6$-gamma-picoline, $eta^6$-quinaldine, $eta^6$-benzopyran, $eta^6$-thiochrome, $eta^6$-benzoxazine, $eta^6$-indole, $eta^6$-acridine, $eta^6$-carbazole, $eta^6$-triphenylene, $eta^6$-silabenzene, $eta^6$-arsabenzene, $eta^6$-stibabenzene, $eta^6$-2,4,6-triphenylphosphabenzene, $eta^5$-selenophene, $eta^6$-dibenzostannepine, $eta^5$-tellurophene, $eta^6$-phenothiarsine, $eta^6$-selenanthrene, $eta^6$-phenoxaphosphine, $eta^6$-phenarsazine, $eta^6$-phenatellurazine, and $eta^6$-1-phenylborabenzene. Other suitable aromatic compounds can be found by consulting any of many chemical handbooks.

As mentioned before, the ligand can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene); the pyridine group in poly(vinylpyridine), etc. Polymers having a weight average molecular weight up to 1,000,000 or more can be used. It is preferable that 5 to 50 percent of the unsaturated or aromatic groups present in the polymer be complexed with metallic cations.

Each of the ligands $L^1$ and $L^5$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Ligands $L^2$ in Formula I, and $L^6$ in formula II are provided by monodentate and polydentate compounds preferably containing up to about 30 carbon atoms and up to 10 hetero atoms selected from nitrogen, sulfur, non-peroxidic oxygen, phosphorus, arsenic, selenium, antimony, and tellurium, upon addition to the metal atom, following loss of zero, one, or two hydrogens, the polydentate compounds preferably forming with the metal, M, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., $NO^+$); compounds of Group VA elements such as ammonia, phosphine, trimethylamine, trimethylphosphine, triphenylamine, triphenylphosphine, triphenylarsine, triphenylstibine, tributylphosphite, isonitriles such as phenylisonitrile, butylisonitrile; carbene groups such as ethoxymethylcarbene, dithiomethoxycarbene; alkylidenes such as methylidene, ethylidene; suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, 1,3-diisocyanopropane, and hydridotripyrrazolyborate; the hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

Ligand $L^3$ in Formula I is provided by any monomeric or polymeric compound having an accessible unsaturated group, such as an acetylenic, $-C \equiv C-$ group or an aromatic group which have accessible pi-electrons regardless of the total molecular weight of the compound.

Illustrative of ligand $L^3$ are the linear and cyclic diene and acetylenic compounds preferably having less than 60 carbon atoms and up to 10 hetero atoms selected from nitrogen, sulfur, non-peroxidic oxygen, phosphorus, arsenic, selenium, boron, antimony, tellurium, silicon, germanium, and tin, such as for example, acetylene, methylacetylene, diacetylene, butadiene, 1,2-dimethylacetylene, 1,3- cyclohexadiene, cyclopentadiene, and 1,4-cyclohexadiene; $eta^3$-allyl, $eta^3$-pentenyl, norbornadiene, $eta^5$-cyclohexadienyl, $eta^6$-cycloheptatriene, $eta^8$-cyclooctatetraene, and substituted and unsubstituted carbocyclic and heterocylic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin, such as, for example, $eta^5$-cyclopentadienyl, $eta^6$-benzene, $eta^6$-mesitylene, $eta^6$-hexamethylbenzene, $eta^6$-fluorene, $eta^6$-naphthalene, $eta^6$-anthracene, $eta^6$-chrysene, $eta^6$-pyrene, $eta^7$-cycloheptatrienyl, $eta^6$-triphenylmethane, $eta^5$-pyrrole, $eta^5$-thiophene, $eta^5$-furan, $eta^6$-pyridine, $eta^6$-gamma-picoline, $eta^6$-quinaldine, $eta^6$-benzopyran, $eta^6$-thiochrome, $eta^6$-benzoxazine, $eta^6$-indole, $eta^6$-acridine, $eta^6$-carbazole, $eta^6$(1,2,3,4,4a,12a)$-eta^6$-(7,8,9,10,10a,10b)chrysene, $eta^6$-triphenylene, $eta^6$, $eta^{6'}$-paracyclophane, $eta^6$, $eta^{6'}$-1,4-diphenylbutane, $eta^6$-silabenzene, $eta^6$-arsabenzene, $eta^6$-stibabenzene, $eta^6$-2,4,6-triphenylphosphabenzene, $eta^5$-selenophene, $eta^6$-dibenzostannepine, $eta^5$-tellurophene, $eta^6$-phenothiarsine, $eta^6$-selenanthrene, $eta^6$-phenoxaphosphine, $eta^6$-phenarsazine, $eta^6$-phenatellurazine, and $eta^6$-1-phenylborabenzene. Other suitable aromatic compounds can be found by consulting any of many chemical handbooks.

Each of the ligands $L^3$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and zero to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo; boryl; halo, e.g., chloro, iodo, bromo, and fluoro, hydroxy; cyano; nitro; nitroso, oxo; dimethylamino, diphenylphosphino, diphenylstibine; trimethylgermane; tributyltin; methylseleno; ethyltelluro; and trimethylsiloxy; condensed rings such as benzo, cyclopental, naphtho, indeno; and the like.

Ligand $L^4$ is provided by monodentate and polydentate compounds preferably containing up to about 30 carbon atoms and zero to 10 hetero atoms selected from nitrogen, sulfur, non-peroxidic oxygen, phosphorus, arsenic, selenium, antimony, and tellurium. Examples of suitable mondentate compounds or groups are carbon monoxide, carbon sulfide, carbon selenide, carbon telluride, alcohols such as ethanol, butanol, and phenol; nitrosonium (i.e., NO+); compounds of Group VA elements such as triphenylamine, triphenylphosphine, triphenylarsine, triphenylstibine, isonitriles such as phenylisonitrile; suitable polydentate compounds or groups include 1,2-bis(diphenylphosphino)-ethane, 1,2-bis(diphenylarsino)ethane, bis(diphenylphosphino)methane, ethylenediamine, propylenediamine, diethylenetriamine, 1,3-diisocyanopropane, and hydridotripyrazolylborate; the hydroxycarboxylic acids such as glycolic acid, lactic acid, salicyclic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as bis(perfluoromethyl)-1,2-dithiolene; aminocarboxylic acids such as alanine, glycine and o-aminobenzoic acid; dicarboxylic diamides such as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc.

Suitable anions, X, in formulae I and II, of use as the counterion in the ionic salts of the organometallic complex cations include those in which X is an organic sulfonate. Illustrative of suitable anions are $CH_3SO_3^-$, $CF_3SO_3^-$, $C_6H_5SO_3^-$, p-toluenesulfonate, p-chlorobenzenesulfonate and related isomers and the like.

Suitable anions, X, in formulas I and II, of use as the counterion in the ionic salts of the organometallic complex cation in the preferred radiation-sensitive compositions of the invention are those in which X has the formula $DZ_r$, wherein D is a metal from Groups IB to VIIIB or a metal or metalloid from Groups IIIA to VA of the Periodic Chart of Elements, Z is a halogen atom, and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phophorus. Preferably, the halogen, Z, of formula II, is chlorine or fluorine. Illustrative of suitable anions are $BF_4^-$, $PF_6^-$, $AsF_6^-$, $SbF_6^-$, $FeCl_4^-$, $SnCl_5^-$, $SbF_5^-$, $AlF_6^-$, $GaCl_4^-$, $InF_4^-$, $TiF_6^-$, $ZrF_6^-$, etc. Preferably, the anions are $BF_4^-$, $PF_6^-$, $SbF_6^-$, $SbF_5OH^-$, $AsF_6^-$, and $SbCl_6^-$.

There are restrictions on the sum of electrons donated by the ligands, $L^1$, $L^2$, $L^3$, and $L^4$, of formula I and $L^5$ and $L^6$ of formula II, and the valence electrons possessed by the metal. For most complex compounds not involving intramolecular metal-metal bonding, this sum is governed by the "eighteen electron rule" [see J. Chem. Ed., 46, 811 (1969)]. This rule is sometimes called the "nine orbital rule", "the effective number rule", or the "rare gas rule". This rule states that the most stable organometallic compounds tend to be those compounds in which the sum of the electrons donated by the ligands and the metal is eighteen. Those skilled in the art, however, know that there are exceptions to this rule and that organometallic complex compounds having a sum of 16, 17, 19, and 20 electrons are also known. Some of these complexes are transient. Therefore, ionic salts of organometallic complex cations not including intramolecular metal-metal bonding, described by formulas I and II in which the complexed metal has a sum of 16, 17, 18, 19, or 20 electrons in the valence shell and a residual net positive charge of 1 or 2, are included within the scope of the invention.

For complex compounds described in formula I in which intramolecular metal-metal bonding exists serious departure from the "eighteen electron rule" can occur. It has been proposed [J. Amer. Chem. Soc. 100, 5305 (1978)] that the departure from the "eighteen electron rule" in these transition metal complexes is due to the metal-metal interactions destabilizing the metal p orbitals to an extent to cause them to be unavailable for ligand bonding. Hence, rather than count electrons around each metal separately in a metal cluster, cluster valence electrons (CVE) are counted. A binuclear complex, MM, is seen to have 34 CVEs. Therefore, ionic salts of binuclear organometallic complex cations are described by Formula I in which the complexed metal cluster, MM, has a sum of 34 CVEs in the valence shell and a residual net positive charge of 1 or 2 are included within the scope of this invention.

Suitable organometallic complex ionic salts described by formulae I or II of use in the compositions of the invention are those salts that upon application of sufficient energy, thermal, accelerated particle (electron beam), or electromagnetic radiation having a wavelength from about 200 to 600 nm, will generate an active species capable of catalyzing the polymerization of polyurethane precursors to a polyurethane. The level of catalytic activity will, of course, depend on the choice of metal, ligands, and counterions in the salt.

Examples of suitable salts of organometallic complex cations useful in the composition of the invention include the following (proposed structures of typical compounds are shown at the end of the list):

($eta^5$-cyclopentadienyl)tricarbonyliron(1+) hexafluorophosphate[a]
($eta^5$-cyclopentadienyl)dicarbonylthiocarbonyliron(1+) tetrafluoroborate
($eta^5$-cyclopentadienyl)carbonylbis(triphenylstibine)iron(1+) hexafluorophosphate
($eta^5$-cyclopentadienyl)tricarbonylruthenium(1+) tetrachloroferrate
($eta^5$-cyclopentadienyl)dicarbonyltriphenylstibineiron(1+) hexafluoroantimonate
($eta^5$-methylcyclopentadienyl)dicarbonylnitrosylmanganese(1+) hexafluoroantimonate[b]
($eta^5$-methylcyclopentadienyl)($eta^3$-allyl)dicarbonylmanganese(1+) tetrafluoroborate[c]
($eta^5$-cyclopentadienyl)tetracarbonylmolybdenum(1+) hexafluorophosphate
($eta^5$-pentadienyl)tricarbonyliron(1+) tetrafluoroborate
($eta^5$-cyclohexadienyl)tricarbonyliron(1+) hexafluoroarsenate[d]
($eta^5$-cyclohexadienyl)(ethylidene)carbonyltriphenylphosphineiron(1+) tetrafluoroborate
($eta^5$-cyclopentadienyl)(ethoxymethylcarbene)carbonyltriphenylphosphine(1+) tetrafluoroborate
($eta^5$-cyclopentadienyl)(dithiomethoxycarbene)dicarbonyliron(1+) hexafluorophosphate
($eta^5$-cyclopentadienyl)dicarbonylmethylisonitrileiron(1+) hexafluoroarsenate
($eta^6$-toluene)tricarbonylmanganese(1+) hexafluoroantimonate[e]
($eta^6$-mesitylene)tricarbonylrhenium(1+) hexafluoroantimonate
($eta^7$-cycloheptatrienyl)tricarbonylchromium(1+) hexafluorophosphate
($eta^7$-cycloheptatrienyl)tricarbonyltungsten(1+) hexafluoroarsenate[f]
($eta^5$-cyclopentadienyl)($eta^2$-1-pentene)dicarbonyliron(1+) tetrafluoroborate
($eta^6$-benzene)($eta^5$-cyclopentadienyl)iron(1+) hexafluorophosphate
($eta^6$-mesitylene)($eta^5$-cyclopentadienyl)iron(1+) tetrafluoroborate
($eta^6$-naphthalene)($eta^5$-cyclopentadienyl)iron(1+) hexafluoroantimonate
($eta^6$-acetophenone)($eta^5$-methylcyclopentadienyl)iron(1+) hexafluoroarsenate
bis($eta^5$-cyclopentadienyl)cobalt(1+) hexafluorophosphate
bis($eta^5$-cyclopentadienyl)iron(1+) hexafluoroantimonate
bis($eta^5$-chlorocyclopentadienyl)nickel(1+) hexafluorophosphate
bis($eta^6$-benzene)chromium(1+) hexafluoroantimonate[g]
bis($eta^6$-hexamethylbenzene)cobalt(2+) hexafluoroarsenate
bis($eta^6$-hexamethylbenzene)nickel(2+) hexafluoroantimonate
tetracarbonyltriphenylphosphinecobalt(1+) hexafluorophosphate
tricarbonylbis(triphenylphosphine)iridium(1+) hexafluorophosphate
($eta^3$-allyl)pentacarbonylchromium(1+) tetrafluoroborate
pentacarbonylnitrosylmolybdenum(1+) hexafluorophosphate
($eta^3$-allyl)tetracarbonyliron(1+) hexafluoroantimonate
hexacarbonylrhenium(1+) hexafluoroantimonate
bis($eta^6$-mesitylene)iron(2+) hexafluoroantimonate[h]
bis($eta^6$-hexamethylbenzene)manganese(1+) tetrafluoroborate
bis($eta^6$-mesitylene)vanadium(1+) hexafluorophosphate
($eta^7$-cycloheptatrienyl)($eta^5$-cyclopentadienyl)manganese(1+) hexafluoroarsenate
($eta^8$-cyclooctatetraenyl)($eta^5$-cyclopentadienyl)chromium(1+) hexafluorophosphate
($eta^6$-fluorene)($eta^5$-cyclopentadienyl)iron(1+) hexafluorophosphate[i]
($eta^6$-1-phenylborabenzene)($eta^5$-cyclopentadienyl)cobalt(1+) hexafluorophosphate
($eta^5$-cyclopentadienyl)($eta^5$-N-methylpyrrolyl)iron(1+) hexafluorophosphate
($eta^6$-2,3,4,5-tetrathiomethoxybenzene)($eta^5$-cyclopentadienyl)iron(1+) hexafluoroarsenate
[($eta^6$-1,2,3,4,5,6)($eta^6$-7,8,9,10,11,12)biphenyl]bis($eta^5$-cyclopentadienyl)diiron(2+) tetrafluoroborate
[($eta^6$-1,2,3,4,4a,9a)($eta^6$-5,6,7,8,8a,5a)fluorene]bis($eta^5$-cyclopentadienyl)diiron(2+) hexafluorophosphate
[($eta^6$-1,2,3,4,4a,12a)($eta^6$-7,8,9,10,10a,6a)chrysene]bis-($eta^6$-benzene)dichromium(2+) hexafluoroantimonate
dicarbonyl[bis(diphenylphosphino)ethane]bis($eta^5$-cyclopentadienyl)diiron(1+) hexafluorophosphate
[($eta^6$-4,5,5a,28c,28b,3a)($eta^6$-8a,8b,20d,-22a,22b,24c)1H,14H-dipyrano(3,4,5-gh: 3',4',5'-g'h')anthra(2",1",9":4,5,6;6",5",10":4',5',6'-)diisoquino(2,1-a:2',1'-a¹)diperimidine]bis($eta^5$-cyclopentadienyl)diiron(2+) hexafluoroantimonate
[($eta^6$-1,2,3,3a,13b,13a)benzo(10,11)chryseno(2,3-d)(1,3)dioxole]($eta^5$-methylcyclopentadienyl)iron(1+) hexafluorophosphate
[($eta^6$-1,2,3,3a,16c,16b)($eta^6$-9,10,11,11a,13c,8b)cycloocta(1,2,3,4-def:5,6,7,8-d'e'f')diphenanthrene]bis($eta^5$-acetylcyclopentadienyl)diiron(2+) tetrafluroborate bis(eta⁵-acetylcyclopentadienyl)iron(1+) tetrafluoroborate
(eta³-1-methylallyl)tricarbonyliron(+1) hexafluorophosphate
(eta³-1,3-dimethylallyl)tricarbonyliron(+1) hexachloroantimonate

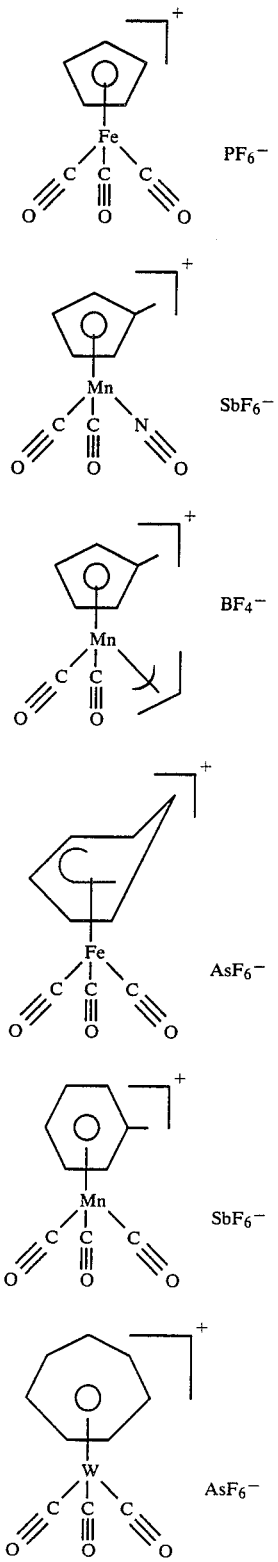

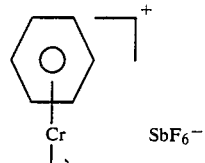

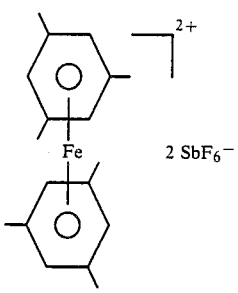

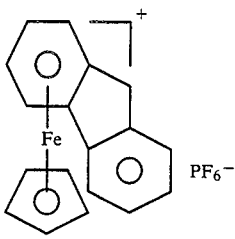

In addition to the compounds of formulae I and II, all of the ionic salts of organometallic complex cations described in U.S. patent application Ser. No. 443,660 (EPO Offenlichungonummer No. 0 094 914), EPO Nos. 109,851 (1984), 094,915 (1983), and 126,712 (1984) are useful in the present invention.

In principle, the catalyst essential to the present invention may be used in any two-component polyurethane systems based on organic polyisocyanates and at least difunctional compounds, such as polyols or other isocyanate-reactive groups as is known in the art.

The polyisocyanate component may be any aliphatic, cycloaliphatic, araliphatic, aromatic, or heterocyclic polyisocyanate, or any combination of such polyisocyanates. Particularly suitable polyisocyanates correspond to the formula $$Q(NCO)_n$$

in which n is an integer 2 to 4, and Q represents an aliphatic hydrocarbon radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 6 to 15 carbon atoms and zero to 10 heteroatoms, or an araliphatic hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Examples of polyisocyanates are as follows: ethylene diisocyanate, 1,4-tetramethylene diisocyanate, 1,6-hexamethylene diisocyanate, trimethylhexamethylene diisocyanate, 1,12-dodecane diisocyanate, cyclobutane-1,3-diisocyanate, cyclohexane-1,3- and -1,4-diisocyanate and mixtures of these isomers, 1-isocyanate-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate, naphthylene-1,5-diisocyanate, and the reaction products of four equivalents of the aforementioned isocyanate-containing compounds with compounds containing two isocyanate-reactive groups.

According to the present invention, it is also possible for example, to use triphenyl methane-4,4',4''-triisocyanate, polyphenyl polymethylene polyisocyanates of the type obtained by condensing aniline with formaldehyde, followed by phosgenation, and described, for example, in British Pat. Nos. 874,430 and 848,671, m- and p-isocyanatophenyl sulphonyl isocyanates according to U.S. Pat. No. 3,454,606, perchlorinated aryl polyisocyanates of the type described, for example in German Auslegeschrift No. 1,157,601 (U.S. Pat. No. 3,277,138), polyisocyanates containing carbodiimide groups of the type described in U.S. Pat. No. 3,152,162 and in German Offenlegungsschrift Nos. 2,504,400, 2,537,685 and 2,552,350, norbornane diisocyanates according to U.S. Pat. No. 3,492,330, polyisocyanates containing allophanate groups of the type described, for example, in British Pat. No. 994,890, in Belgian Pat. No. 761,626 and in Dutch Patent Application No. 7,102,524, polyisocyanates containing isocyanurate groups of the type described, for example in U.S. Pat. No. 3,001,973, in German Pat. Nos. 1,022,789, 1,222,067 and 1,027,394 and German Offenlegungsschrift Nos. 1,929,034 and 2,004,048, polyisocyanates containing urethane groups of the type described, for example, in Belgian Pat. No. 752,261 or in U.S. Pat. Nos. 3,394,164 and 3,644,457, polyisocyanates containing acrylated urea groups according to German Pat. No. 1,230,778, polyisocyanates containing biuret groups of the type described, for example, in U S. Pat. Nos. 3,124,605, and 3,201,372 and in British Pat. No. 889.050, polyisocyanates produced by telomerization reactions of the type described for example in U.S. Pat. No. 3,654,106, polyisocyanates containing ester groups of the type described, for example, in British pat. Nos. 965,474 and 1,072,956, in U.S. Pat. No. 3,567,763 and in German Pat. No. 1,231,688, reaction products of the above-mentioned diisocyanates with acetals according to German Patent No. 1,072,385 and polyisocyanates containing polymeric fatty acid esters according to U.S. Pat. No. 3,455,883.

It is also possible to use distillation residues having isocyanate groups obtained in the commercial production of isocyanates, optionally in solution in one or more of the above-mentioned polyisocyanates. It is also possible to use any mixtures of the above-mentioned polyisocyanates.

Preferred polyisocyanates are hexamethylene diisocyanate, its isocyanurate and its biuret; 1-isocyanato-3,3,5-trimethyl-5-isocyanatomethyl cyclohexane (isophorone diisocyanate); the tolylene diisocyanates and their isocyanurates; the mixed isocyanurate of tolylene diisocyanate and hexamethylene diisocyanate; the reaction product of 1 mol of trimethylol propane and 3 mols of tolylene diisocyanate and also crude diphenyl methane diisocyanate.

Suitable compounds containing at least 2 isocyanate-reactive hydrogen atoms can be high or low molecular weight compounds, a molecular weight, generally from about 400 to 50,000. In addition to compounds containing amino groups, thiol groups or carboxyl groups, are, preferably, compounds containing hydroxyl groups, particularly compounds containing from about 2 to 50 hydroxyl groups and above all, compounds having a weight average molecular weight of from about 500 to 25000, preferably from about 700 to 2000, for example, polyesters, polyethers, polythioethers, polyacetals, polycarbonates, poly(meth)acrylates, and polyester amides containing at least 2, generally from about 2 to 8, but preferably from about 2 to 4 hydroxyl groups, or even hydroxyl-containing prepolymers of these compounds and a less than equivalent quantity of polyisocyanate, of the type known for the production of polyurethanes.

Classes of isocyanate-reactive group-containing compounds include:

(a) Polyesters containing hydroxyl groups suitable for use in accordance with the present invention are, for example, reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be saturated or unsaturated aliphatic or cycloaliphatic, aromatic and/or heterocyclic and may optionally be substituted, for example by halogen atoms.

Examples of carboxylic acids and their derivatives are succinic acid, adipic acid, suberic acid, azelaic acid, sebacic acid, phthalic acid, isophathalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally in admixture with monomeric unsaturated fatty acids, such as oleic acid, terephthalic acid dimethyl ester and terphthalic acid-bisglycol ester.

Examples of suitable polyhydric alcohols are ethylene glycol, 1,2- and 1,3-propylene glycol, 1,4- and 2,3-butylene glycol, 1,6-hexanediol, 1,8-octanediol, neopentyl glycol, 1,4-bis-hydroxymethylcyclohexane, 2-methyl-1,3-propanediol, glycerol, trimethylol propane, 1,2,6-hexanetriol, 1,2,4-butanetriol, trimethylol ethane, pentaerythritol, quinitol, mannitol, sorbitol, formitol, methyl glycoside, also diethylene glycol, triethylene glycol, tetraethylene glycol and higher polyethylene glycols, dipropylene glycol and higher polypropylene glycols, dibutyl glycol and higher polybutylene glycols. The polyesters may contain terminal carboxyl groups. Polyesters of lactones, for example, epsilon-caprolactone, or of hydroxy carboxylic acids, for example, omega-hydroxy caproic acid, may also be used.

(b) Polyethers containing at least 2, generally about 2 to 8 and preferably 2 or 3 hydroxyl groups suitable for use in accordance with the invention are also known. There are obtained, for example, by polymerizing cyclic ethers, such as ethylene oxide, propylene oxide, butylene oxide, tetrahydrofuran, styrene oxide or epichlorohydrin on their own, for example, in the presence of Lewis catalysts, such as boron trifluoride, or by the addition of the epoxides, preferably ethylene oxide and propylene oxide, optionally in admixture or successively, with starter components containing reactive hydrogen atoms, such as water, alcohols, ammonia or amines, for example, ethylene glycol, 1,3-propylene glycol or 1,2-propylene glycol, trimethylol propane, glycerol, sorbitol, 4,4'-dihydroxy diphenyl propane aniline, ethanolamine or ethylene diamine. Sucrose polyethers of the type described, for example, in German Auslegeschrift Nos. 1,176,358 and 1,064,938 and formitol- or formose-started polyethers (German Offenlegungsschrift Nos. 2,639,083 and 2,737,951) may also be used in accordance with the present invention. In many cases, it is preferred to use polyethers which predominantly contain primary hydroxyl groups (up to about 90% by weight, based on all the hydroxyl groups present in the polyether). Polybutadienes containing hydroxyl groups are also suitable for use in accordance with the present invention.

(c) Among the polythioethers, reference is made in particular to the condensation products of thiodiglycol on its own and/or with other glycols, dicarboxylic acids, formaldehyde, aminocarboxylic acids or amino alcohols. Depending on the co-components, the products can be, for example, polythio mixed ethers, polythioether esters or polythioether ester amides.

(d) Suitable polyacetals are, for example, the compounds obtainable from glycols, such as diethylene glycol, triethylene glycol, 4,4'-diethoxydiphenyldimethylmethane, hexanediol and formaldehyde. Polyacetals suitable for use in accordance with the present invention may also be obtained by polymerizing cyclic acetals such as trioxane (German Offenlegungsschrift No. 1,694,128).

(e) Suitable polycarbonates containing hydroxyl groups are known per se and can be obtained, for example, by reacting diols, such as 1,3-propanediol, 1,4-butanediol and/or 1,6-hexanediol, diethylene glycol, triethylene glycol, tetraethylene glycol or thiodiglycol, with diaryl carbonates, for example, diphenyl carbonate, or phosgene (German Auglegeschrift Nos. 1,694,080, 1,915,908 and 2,221,751; German Offenlegungsschrift No. 2,605,024).

(f) Suitable polyhydroxy (meth)acrylic resins are polymers and copolymers of mono esters of (meth)acrylic acid and polyhydric alcohols useful for making polyester polyols (see a, above), for example homopolymers and copolymers of hydroxyethyl (meth)acrylate, hydroxypropyl (meth)acrylate, and the like, and G-cure TM acrylic resin (Henkel Corp., Minneapolis, MN), Desmophen TM A resins (Mobay Corp., Pittsburgh, PA) and hydroxyl functional Acryloid TM resins (Rohm and Haas, Philadelphia, PA) and the like.

(g) Polyester amides and polyamides include, for example, the predominantly linear condensates obtained, for example, from the reaction of polybasic saturated or unsaturated carboxylic acids or their anhydrides with polyhydric saturated or unsaturated amino alcohols, diamines, polyamines and mixtures thereof.

(h) Polyhydroxyl compounds already containing urethane or urea groups and optionally modified natural polyols, such as carbohydrates, for example, starch, may also be used. Addition products of alkylene oxides with phenol/formaldehyde resins or even with urea/formaldehyde resins may also be used in accordance with the present invention.

(i) Before they are used in the polyisocyanatepolyaddition process, the above-mentioned polyhydroxyl compounds may be modified in various ways. Thus, according to U.S. Pat. No. 3,849,515, a mixture of different polyhydroxyl compounds (for example, a polyether polyol and a polyester polyol) may be condensed by etherification in the presence of a strong acid to form a relatively high molecular weight polyol which is made up of different segments attached through ether bridges.

(j) According to the present invention, it is also possible to use polyhydroxyl compounds containing high molecular weight polyadducts and polycondensates or prepolymers in a finely dispersed or dissolved form. Polyhydroxyl compounds such as these are obtained, for example, by carrying out polyaddition reactions (for example, reactions between polyisocyanates and aminofunctional compounds) and polycondensaton reactions (for example, between formaldehyde and phenols and/or amines) in situ in the above-mentioned compounds containing hydroxyl groups. Processes such as these are described, for example, in German Auslegeschrift Nos. 1,168,075 and 1,260,142 and in German Offenlegungsschrift Nos. 2,324,134, 2,423,984, 2,512,385, 2,513,815, 2,550,796, 2,550,797, 2,550,833, 2,550,862, 2,633,293 and 2,639,254. It is also possible, however, in accordance with U.S. Pat. No. 3,869,413, to mix an aqueous polymer dispersion with a polyhydroxyl compound and subsequently to remove the water from the resultant mixture.

Polyhydroxyl compounds modified by vinyl polymers of the type obtained, for example, by polymerizing styrene and acrylonitrile in the presence of polyethers (U.S. Pat. Nos. 3,383,351, 3,304,273, 3,523,093 and 3,110,695; German Auslegeschrift No. 1,152,536) or polycarbonate polyols (German Pat. No. 1,769,795; U.S. Pat. No. 3,637,909) are also suitable for use in the process according to the present invention. Plastics having particularly good flameproof properties are obtained by using polyether polyols modified in accordance with German Offenlegungsschrift Nos. 2,442,101, 2,644,922 and 2,646,141 by graft polymerization with vinyl phosphonic acid esters and, optionally (meth)acrylonitrile (meth)acrylamide or hydroxyl functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschrift Nos. 2,714,291, 2,739,620 and 2,654,746) may be used particularly advantageously in combination with mineral fillers.

Where modified polyhydroxyl compounds of the type mentioned above are used as starting components in the polyurethane precursor polymerization process, the resultant polyurethanes having considerably improved mechanical properties are formed in many cases.

Representatives of the above-mentioned compounds used in accordance with the present invention are described, for example, in High Polymers, Vol. XVI, "Polyurethanes, Chemistry and Technology", By Saunders and Frisch, Interscience Publishers, New York/London, Vol., I, 1962, pages 32 to 42 and pages 44 to 54 and Vol. II, 1964, pages 5–6 and 198–199, and in Kunststoff-Handbuch, Vol. VII, Vieweg-Hochtlen, Carl-HanserVerlag, Munich, 1966, for example, on pages 45 to 71. It is, of course, possible to use mixtures of the above-mentioned compounds containing at least two isocyanate-reactive hydrogen atoms and having a molecular weight of from about 400 to 50,000 for example, mixtures of polyethers and polyesters.

In some cases, it is particularly advantageous to combine low-melting and high-melting polyhydroxyl containing compounds with one another (German Offenlegungsschrift No. 2,706,297).

Low molecular weight compounds containing at least two isocyanate-reactive hydrogen atoms (molecular weight from about 50 to 400) suitable for use in accordance with the present invention are compounds preferably containing hydroxyl groups and generally containing from about 2 to 8, preferably from about 2 to 4 isocyanate-reactive hydrogen atoms. It is also possible to use mixtures of different compounds containing at least two isocyanate-reactive hydrogen atoms and having a molecular weight in the range of from about 50 to 400. Examples of such compounds are ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-bishydroxymethylcyclohexane, 2-methyl-1,3-propane diol, dibromobutene diol (U.S. Pat. No. 3,723,392), glycerol, trimethylol propane, 1,2,6-hexanetriol, trimethylol ethane, pentaerythritol, quinitol, mannitol, sorbitol, diethylene glycol, triethylene glycol, tetraethylene glycol, higher polyethylene glycols having molecular weight of up to about 400, dipropylene glycol, higher polypropylene glycols having a molecular weight of up to about 400, dibutylene glycol, higher polybutylene glycols having a molecular weight of up to about 400, 4,4'-dihydroxy diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084, 2,714,084, 2,714,104, 2,721,186, 2,738,154 and 2,738,512). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in accordance with the present invention (German Offenlegungsschrift No. 2,638,759).

In general, radiation-induced polymerization of polyurethane precursors with the ionic salt of an organometallic complex cation can be carried out at room temperature for the majority of polyurethane precursors, although low temperature (e.g., $-10°$ C.) or elevated temperature (e.g., 30° to 200° C., preferably 50° to 150° C.) can be used to subdue the exotherm of polymerization or to accelerate the polymerization, respectively. In the case of latent catalysts of this invention, temperatures generally in the range of 50° to 250° C., preferably from 50° to 150° C., can be used. Temperature of polymerization and amount of catalyst will vary and be dependent on the particular polyurethane precursors used and the desired application of the polymerized or cured product. The amount of ionic salt of an organometallic complex cation to be used as a catalyst in this invention should be sufficient to effect polymerization of the polyurethane precursors (i.e., a catalytically-effective amount) under the desired use conditions. Such amount generally will be in the range of about 0.01 to 20 weight percent, preferably 0.1 to 5.0 weight percent, and most preferably 0.5 to 2.0 weight percent, based on the weight of polyurethane precursors.

In some applications, notably coatings, sensitivity of curable compositions to moisture can be a problem, as defects may be formed, e.g., bubbles, foam, pin holes, and the like; polymerizable compositions of this invention are insensitive to adventitious moisture.

In contrast to photocured urethane (meth)acrylates, energy polymerizable compositions of this invention are insensitive to atmospheric oxygen.

Solvents can be used to assist in dissolution of the ionic salt in the polyurethane precursor and are preferred for use in the polymerizable compositions. Representative solvents include acetone, methyl ethyl ketone, cyclopentanone, methyl cellosolve acetate, methylene chloride, nitromethane, methyl formate, acetonitrile, gamma-butyrolactone, and 1,2-dimethoxyethane (glyme).

For those compositions of the invention which are radiation-sensitive, i.e., the compositions containing polyurethane precursors and an ionic salt of an organometallic complex cation of Formula I or II, any source of radiation including electron beam radiation and radiation sources emitting active radiation in the ultraviolet and visible region of the spectrum (e.g., about 200 to 600 nm) can be used. Suitable sources of radiation include mercury vapor discharge lamps, carbon arcs, tungsten lamps, xenon lamps, sunlight, etc. The required amount of exposure to effect polymerization is dependent upon such factors as the identity and concentration of the ionic salt of the organometallic complex cation, the particular polyurethane precursors, the thickness of the exposed material, type of substrate, intensity of the radiation source and amount of heat associated with the radiation. Optionally, it is within the scope of this invention to include photosensitizers or photoaccelerators in the radiation-sensitive compositions. Use of photosensitizers or photoaccelerators alters the wavelength sensitivity of radiation-sensitive compositions employing the latent catalysts of this invention. This is particularly advantageous when the latent catalyst does not strongly absorb the incident radiation. Use of a photosensitizer or photoaccelerator increases the radiation sensitivity, allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of the reference, Steven L. Murov, Handbook of Photochemistry, Marcel Dekker Inc., NY, 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer or photoaccelerator used in the practice of the present invention is generally in the range of 0.01 to 10 parts, and preferably 0.1 to 1.0 parts, by weight of photosensitizer or photoaccelerator per part of organometallic salt.

It is within the scope of this invention to include two-stage polymerization (curing), by first activating the initiator of Formulae I and II by irradiating the curable compositions and subsequently heat-curing the activated precursors so obtained, the irradiation temperature being below the temperature employed for the subsequent heat-curing. These activated precursors may normally be cured at temperatures which are substantially lower than those required for the direct heat-curing, with advantage in the range from 50° to 110° C. This two-stage curing also makes it possible to control the polymerization in a particularly simple and advantageous manner.

Adjuvants such as solvents, pigments, stabilizers, light stabilizers, antioxidants, flow agents, bodying agents, flatting agents, colorants, inert fillers, blowing agents, fungicides, bacteriocides, surfactants, plasticizers, and other additives as known to those skilled in the art of polyurethane science and technology can be added to the compositions of this invention. These can be added in an amount effective for their intended purpose.

Compositions of this invention are useful for coatings, foams, shaped articles, adhesives, filled or reinforced composites, and other applications which are known to those skilled in the art of polyurethane science and technology.

Compositions of this invention may be applied, preferably as a liquid, to a substrate such as steel, aluminum, copper, cadmium, zinc, paper, wood, or various plastic films such as poly(ethylene terephthalate), plasticized poly(vinylchloride), poly(propylene), poly(ethylene), and the like, and irradiated. By polymerizing part of the coating, as irradiation through a mask, those sections which have not been exposed may be washed with a solvent to remove the unpolymerized portions while leaving the photopolymerized, insoluble portions in place. Thus, compositions of this invention may be used in the production of articles useful in the graphic arts such as printing plates and printed circuits. Methods of producing printing plates and printed circuits from photopolymerizing compositions are well known in the art (see for example British Patent Specification No. 1,495,746).

Objects and advantages of this invention are further illustrated by the following examples, but the particular materials and amounts thereof recited in these examples, as well as other conditions and details, should not be construed to unduly limit this invention. In the examples, all parts are parts by weight unless indicated otherwise. All examples were prepared in ambient atmosphere (presence of oxygen and water) unless indicated otherwise.

EXAMPLE 1

A 0.56 g poly(ethylene glycol) (mw 400, Carbowax ™ 400, Union Carbide, Danbury, Conn.) and 0.41 g 4,4'-methylenebis(cyclohexylisocyanate) (Desmodur ™ W, Mobay Corp., Pittsburgh, Pa.), and ca. 0.01 g (eta$^5$-cyclopentadienyl)(eta$^6$-fluorene)iron(+1) hexafluorophosphate in 0.4 g methylene chloride. The resulting solution was irradiated with a Kodak Carousel ™ projector. After 2 minutes heat evolution and a substantial viscosity increase were noted, complete cure effected by 10 minutes irradiation.

An identical sample prepared and left in the dark for 16 hours was unchanged. Infrared spectra of the irradiated and dark samples confirmed the presence of only starting materials in the dark sample and >94% conversion of the diisocyanate to polyurethane in the irradiated sample.

Two samples were prepared as above but without (eta$^5$-cyclopentadienyl)(eta$^6$-fluorene)iron(+1) hexafluorophosphate. One was placed in the dark, the other irradiated for 1 hour, then placed in the dark. After irradiation, and after 16 hours in the dark, there was no evidence of curing in either sample, as measured by the absence of any noticeable increase in the viscosity. These results showed the positive effect upon curing provided by radiation when an organometallic salt was present in the reaction composition.

EXAMPLE 2

To a mixture of 1.2 parts 1,6-hexanediisocyanate and 2.8 parts poly(ethylene glycol) (molecular weight 400, Carbowax ® 400) was added 0.1 part of a solution of 1 part (eta$^5$-cyclopentadienyl)(eta$^6$-mesitylene)iron(+1) hexafluorophosphate in 3 parts gamma-butyrolactone. The sample was irradiated using a Kodak Carousel ™ projector for 3 minutes, during which time the sample cured to a highly viscous material. A thermal post-cure of 10 minutes at 60°±5° C. followed. Infrared and proton nmr spectra of the crude resin were identical to those obtained when the salt of the organometallic complex cation was replaced by dibutyltin dilaurate and the sample heated to 60° C. in place of the irradiation.

The results show that whereas the latent catalysts of this invention cured the polyurethane precursors in the presence of light and/or heat, the resultant polyurethanes formed were typical of those formed via conventional methods.

EXAMPLES 3–7

A stock solution of 7 parts 4,4,-methylenebis(cyclohexylisocyanate) (Desmodur W), 1.9 parts 1,4-butanediol, and 0.5 parts trimethylolpropane was prepared. To 1.0 g aliquots were added 0.05 g of a 20% solution of the catalyst (eta$^5$-cyclopentadienyl)(eta$^6$-mesitylene)iron(+1) X$_f$ in gamma-butyrolactone. Samples were irradiated using a Kodak Carousel ™ projector. The times required to solidify each of the samples is shown in Table I below.

TABLE I

| Example No. | X$_f$ | Cure time (minutes) |
|---|---|---|
| 3 | CF$_3$SO$_3^-$ | 11.8 |
| 4 | BF$_4^-$ | 120 |
| 5 | PF$_6^-$ | 5.0 |
| 6 | AsF$_6^-$ | 4.5 |
| 7 | SbF$_6^-$ | 4.5 |

These examples show that the counterion, X$_f$, effected the rate of the photocuring of polyurethane precursors to polyurethanes using catalysts of the type: (eta$^5$-cyclopentadienyl)(eta$^6$-mesitylene)iron(+1) X$_f$.

EXAMPLES 8–19

A variety of radiation-sensitive, polymerizable compositions are demonstrated.

A stock solution was prepared containing 6.5 parts poly(ethylene glycol) (molecular weight 400, Carbowax 400), 0.26 parts trimethylolpropane, and 3.23 parts 1,6-hexanediisocyanate. To a solution of 0.01 g catalyst in 0.05 g gamma-butyrolactone was added 1.0 g of the stock solution. Samples were irradiated at room temperature (22° C.) using a Kodak carousel projector. The time required to solidify each of the samples is recorded in Table II below.

TABLE II

| Example No. | Catalyst | Cure time (minutes) |
|---|---|---|
| 8 | None | >720 |
| 9 | (eta$^5$-cyclopentadienyl)(triphenylstibine)-dicarbonyliron(+1) hexafluoroantimonate | 17.5 |
| 10 | (eta$^5$-cyclopentadienyl)[eta$^6$-1,2,3,4,4a,9a-(9-cinnamylidenefluorene)]iron(+1) hexafluorophosphate | 3.2 |
| 11 | (eta$^5$-cyclopentadienyl)(eta$^6$-naphthalene)-iron(+1) hexafluorophosphate | 1.9 |
| 12 | (eta$^5$-cyclopentadienyl)(eta$^6$-toluene)iron(+1) hexafluoroantimonate | 1.5 |
| 13 | (eta$^5$-cyclohexadienyl)tricarbonyliron(+1) hexafluoroantimonate | 17.5 |
| 14 | [(eta$^6$-1,2,3,4,4a,9a)(eta$^6$-5,6,7,8,8a,5a)-fluorene]bis(eta$^5$-cyclopentadienyl)diiron(2+) hexafluorophosphate | 1.8 |
| 15 | (eta$^5$-cyclopentadienyl)(eta$^6$-fluorene)iron(+1) hexafluorophosphate | 1 |
| 16 | (eta$^5$-methylcyclopentadienyl)(eta$^3$-allyl)-dicarbonylmanganese(+1) hexafluoroarsenate | 12 |
| 17 | (eta$^7$-cycloheptatrienyl)tricarbonyl-molybdenum(+1) hexafluorophosphate | 4 |
| 18 | (eta$^5$-methylcyclopentadienyl)(nitrosyl)-dicarbonylmanganese(+1) hexafluorophosphate | 8 |
| 19 | hexacarbonylrhenium(+1) hexafluorophosphate | 50 |

Corresponding samples were prepared which were not exposed to light. In each case, irradiated samples cured before the dark sample.

EXAMPLE 20

This example compares a catalyst of the present invention with a tertiary amine catalyst which is known to catalyze both the urethane formation and isocyanate/water reactions, the latter resulting in formation of a foamed polyurethane.

A stock solution was prepared containing 4.02 parts methylenebis(4,4'-cyclohexylisocyanate) (Desmodur W) and 5.62 parts wet poly(ethylene glycol) (mw 400, Carbowax 400). By wet, it is meant that the poly(ethylene glycol) was used as received, being well-known that this material readily absorbs atmospheric moisture. Two aliquots of stock solution, 2.0 g each, were taken. To one was added 0.5 g of a 10% by weight solution of (eta$^5$-cyclopentadienyl)(eta$^6$-fluorene)iron(+1) hexafluorophosphate in gamma-butyrolactone, to the other was added 0.05 g 1,4-diazabicyclo[2.2.2]octane (DABCO, Aldrich Chemical, Co., Milwaukee, Wis.). The sample containing the salt of an organometallic complex cation was irradiated using a Kodak Carousel projector until cured, during which time the sample gave off heat (exotherm). Few small bubbles (20-30) formed and were entrapped in the matrix. The DABCO-containing sample began to cure upon addition of the amine, with vigorous foaming. Complete cure of the DABCO-containing sample necessitated heating to 70°-80° C., during which time the vial filled with foam.

The results showed the insensitivity of the curing process of the present invention to adventitious moisture.

EXAMPLE 21

A mixture was prepared containing 2.66 parts biuret of 1,6-hexanediisocyanate (Desmodur TM N-100, Mobay), 5.58 g polyester polyol equivalent weight about 440 (Desmophen TM 670-90, Mobay), and 0.06 parts of a 17% solution of (eta$^5$-cyclopentadienyl)(eta$^6$-fluorene)iron(+1) hexafluorophosphate in gamma-butyrolactone. The mixture was poured into a cylindrical Teflon TM (DuPont, Wilmington, Del.) mold, 1 inch diameter×0.5 inch depth, and irradiated from the top using a suntan lamp (General Electric Corp., Schenectady, N.Y.) for 25 minutes, during which time the mixture cured. The material was removed from the mold as a solid cyclindrical article.

EXAMPLE 22

Comparison of the radiation-sensitive curing process of the present invention with those of U.S. Pat. Nos. 4,549,945 and 4,544,466.

A stock solution was prepared containing 9 parts 1,4-butanediol and 16.8 parts 1,6-hexanediisocyanate. Three pairs of samples, each sample weighing 1.06 g and were prepared from 0.01 g latent catalyst, 0.05 gamma-butyrolactone, and 1.0 g stock solution. Each latent catalyst was placed in two samples, one sample was irradiated with a Kodak Carousel TM projector, the other sample was placed in the dark (protected from light). Cure times are recorded in the Table below.

| Catalyst | Cure time (minutes) in light | in dark |
|---|---|---|
| (eta$^5$-cyclopentadienyl)(eta$^6$-fluorene)iron(+1)hexafluorophosphate (invention) | 1.25 | >135 |
| p-nitrobenzenediazonium hexafluorophosphate (U.S. Pat. No. 4,544,466, Ex. No. III, sample 5) | >135* | >135 |
| hexaphenylditin (U.S. Pat. No. 4,549,945, Ex. No. II) | >135 | >135 |

*bleached (changed color from yellow to colorless) in five minutes but did not cure.

EXAMPLE 23

A stock solution was prepared containing 1 part tolylene diisocyanate and 2.3 parts poly(ethylene glycol) (mw 400, Carbowax 400). Four 1.5 g aliquots were taken, to two of them was added 0.07 g of a 5% solution of (eta$^5$-cyclopentadienyl)(eta$^6$-fluorene)iron(+1) hexafluorophosphate in gamma-butyrolactone, the other two aliquots were left without catalyst. One sample containing catalyst and one containing no catalyst were irradiated using a Kodak Carousel projector. The sample containing the catalyst cured in 30 seconds, while the sample containing no catalyst remained uncured after 1800 seconds. One sample containing catalyst and one sample containing no catalyst were placed in the dark. Both remained uncured after 50 minutes.

EXAMPLES 24-27

Thermally sensitive, polymerizable compositions were demonstrated.

A stock solution was prepared as in examples 8-19. To 1 g aliquots of the stock solution were added solutions of salts of organometallic complex cations in gamma-butyrolactone, such that the final composition contained 1% catalyst by weight. Vials containing the polymerizable compositions were placed in an oil bath at 130° C., and the times required to cure the sample recorded in the table below.

| Example No. | Catalyst | Cure time (minutes) |
|---|---|---|
| 24 | bis(eta$^6$-mesitylene)iron(+2) | 0.9 |

-continued

| Example No. | Catalyst | Cure time (minutes) |
|---|---|---|
|  | hexafluorophosphate |  |
| 25 | bis(eta$^6$-hexamethylbenzene)cobalt(+2) hexafluorophosphate | 1.2 |
| 26 | (eta$^5$-methylcyclopentadienyl) dicarbonylnitrosylmanganese(+1) hexafluoroantimonate | 0.7 |
| 27 | none | 60 |

EXAMPLES 28–30

Part A of the two-part polyurethane coating, the polyol portion, consisted of 100 parts Desmophen ™ 670-90 (a polyester polyol, Mobay), 0.40 parts FC 430 (flow additive, 3M Company, St. Paul, Minn.), and 50 parts PM acetate (solvent, Ashland Chemical Company, Columbus, Ohio). Part B consisted of 43.37 parts Desmodur ™ N-100 (Mobay). The catalysts were weighed as in the Table, dissolved in a small amount of gamma-butyrolactone, and mixed with part A. The isocyanate to hydroxyl ratio (NCO/OH) was 1.0 after mixing 20 parts A and 5.76 parts B. The formulations of the Table were mixed and a small portion of the liquid mixture was poured onto the surface of 7.6 cm×12.7 cm×0.06 cm (3 in.×5 in.×0.025 in.) Alodined$v$ brand aluminum Q-Panels ™ (Q-Panel Company, Cleveland, Ohio), and spread evenly to a wet thickness of 12.7 micrometers (0.5 mil) by conventional coating means (doctor blade). The coated panels were then baked at 72° C., and the time required for the coating to reach a tack-free state (set-to-cotton) recorded. By "set-to-cotton" is meant a cotton ball pressed onto the surface of a coating with moderate pressure leaves no visible fibers attached to the coating when the cotton is pulled away. The remainder of each formulation was reserved, and the pot-life measured, pot-life being the time required for the viscosity of the solution to double, as measured using a Brookfield ™ viscometer (Brookfield Engineering Laboratories, Inc., Stoughton, Mass.).

| Ex. No. | Catalyst (parts) | Tack-free* (minutes) | Pot-life (hours) |
|---|---|---|---|
| 28 | dibutyltin dilaurate (0.02) | 15 | 0.8 |
| 29 | (eta$^5$-methylcyclopentadienyl)-dicarbonylnitrosylmanganese(+1) hexafluorophosphate (0.04) | 20 | 7 |
| 30 | bis(eta$^6$-mesitylene)iron(+2) hexafluorophosphate (0.04) | 18 | 4 |

*set-to-cotton

The results of these examples illustrates the utility of salts of organometallic complex cations as heat activated catalysts for polyisocyanate/polyol polymerization reactions in coatings (ASTM type 4, 2 component or package, catalyst urethane coating; ASTM, 1987 Annual Book of ASTM Standards, Section 6, Paints, Related Coatings, and Aromatics, Volume 06.01, Philadelphia, Pa.).

EXAMPLES 31–34˙

The components, formulation, and coating methods of Examples 29-31 were used with the exception of the catalysts and curing methods. For curing conditions, heat only means the coated panel was placed in an oven at 72° C. and baked until tack-free (set-to-cotton). Light+heat means that the panels were placed under sunlamps for 2 minutes, followed by baking in an oven at 72° C. until tack-free (set-to-cotton). Under these conditions, the time listed in the Table is the total time to reach a tack-free state (set-to-cotton).

| Ex. No. | Catalyst (parts) | Tack-free* time (min.) Heat | Tack-free* time (min.) Heat + light | Pot-life (hours) |
|---|---|---|---|---|
| 31 | none (0.00) | 150 | not done | >6 |
| 32. | (eta$^5$-cyclopentadienyl)-(eta$^6$-fluorene)iron(+1) hexafluorophosphate (0.04) | 15 | 4 | <1 |
| 33 | mixture of 60% (eta$^5$-cyclopentadienyl)(eta$^6$-naphthalene)iron(+1) hexafluoroantimonate and 40% (eta$^5$-cyclopentadienyl)-(eta$^6$-tetralin)iron(+1) hexafluoroantimonate (0.04) | 15 | 4 | 1 |
| 34 | same catalyst as in Example 34 (0.004) | 40 | 7 | 5.5 |

*set-to-cotton

These examples illustrate the utility of salts of organometallic complex cations as latent, light- and/or heat-activated catalysts for polyisocyanate/polyol polymerization reaction for coatings (ASTM type 4, 2-component, see Examples 28-30).

EXAMPLE 35

The following formulation was mixed and coated onto an Alodined brand Aluminum Q panel with a knife coater, about 10 micrometer wet thickness (0.5 mil wet thickness): 0.02 g of a mixute of 60% (eta$^5$-cyclopentadienyl)(eta$^6$-naphthalene)iron(+1) hexafluoroantimonate and 40% (eta$^5$-cyclopentadienyl)(eta$^6$-tetralin)iron(+1) hexafluoroantimonate dissolved in 0.04 g gamma-butyrolactone, 10.0 g K-flex ™ 148 experimental polyester polyol (hydroxyl equivalent weight 238, King Industries, Inc., Norwalk, Conn.), and 7.6 g Desmodur N-3200 (Mobay). The coated panel was covered with a clear polyester sheet and a #1-T Resolution Guide (Stouffer Graphic Arts Equipment Co., South Bend, Ind.) was taped on top of the polyester. The resultant layered structure was irradiated under sunlamps at 152° F. (67° C.) for seven minutes. The polyester was then removed and the panel was covered with black toner powder (No. 416, 3M, St. Paul, Minn.). Excess toner was removed with a paper towel revealing a positive image of the Resolution Guide.

This example demonstrates an imaging system based on photo-detackification of polyurethane precursors using latent catalysts of the present invention.

EXAMPLES 36 and 37

The purpose of these examples is to demonstrate solvent developed, negative acting polyurethane photoresists.

For Examples 36 and 37, a stock solution of 2.0 parts polyester polyol (K-Flex ™ 148, King Industries, Norwalk, CT), 1.52 parts Desmodur N-3200, 6.5 parts methyl ethyl ketone, and 0.03 parts (eta$^5$-cyclopentadienyl)(eta$^6$-naphthalene)iron(+1) hexafluorophosphate was prepared.

EXAMPLE 36

The stock solution was coated on an Alodined brand aluminum Q panel with a #22 wire wound bar, and the solvent allowed to evaporate. A poly(vinylidene chloride)-primed polyester film (Scotch Par ™ 3M, St. Paul, Minn.) was placed over the coating and the resultant construction was exposed through a 21 step sensitivity guide (Stouffer Graphic Arts Equipment Co., Inc., South Bend, Ind.) for two minutes in a 3M Model 70 Overhead Transparency Maker ™ (3M, St. Paul, Minn.). After exposure, the sample was heated in an oven at 140° C. for 30 seconds, the polyester film removed, and the Q panel rinsed with methyl ethyl ketone, leaving a negative image of the sensitivity guide (six solid steps). Identical results were obtained using anodized aluminum as substrate (printing plate stock).

EXAMPLE 37

The stock solution was coated on poly(vinylidene chloride)-primed polyester using a #22 wire wound bar. Polypropylene film was placed over the coating, the resultant composite construction was taped to an Alodined brand aluminum Q panel and exposed through a sensitivity guide in a 3M Model 70 overhead maker for 2 minutes. After exposure the four-layer construction was placed in an oven at 140° C. for 30 seconds, the polypropylene removed, and the image developed by rinsing with methyl ethyl ketone, leaving three solid steps in a negative image.

EXAMPLE 38

This example demonstrates two-stage curing (light followed by heat) and the curing temperature difference between exposed and unexposed coatings.

A coating was prepared and coated on poly(vinylidene chloride)-primed polyester film as in the Example 36. The solvent was evaporated and polypropylene film placed over the coating. A strip 2 cm×13 cm was cut, half of it masked (1 cm×13 cm), and exposed 50 seconds in a Model 179 contact printer-processor operating at 1.5 mw/cm² over the wavelength range 450-600 nm. The film was then exposed to a thermal gradient (60°-150° C., about 7 C degrees/cm) on a Heizbank Thermal Gradient (Reichert Type 7841, Austria) for 18 seconds. The polypropylene film was removed and the coating rinsed with methyl ethyl ketone. The light-exposed coating was cured where exposed to temperatures greater than 75° C., while the dark (unexposed) coating was cured where exposed to temperatures greater than 125° C. This demonstrates that photoactivation of the catalyst results in a temperature differential of 50 C degrees, a range in which the latent image may be amplified with little or no background development.

EXAMPLE 39

Use of various polyurethane precursors for a polyurethane imaging system is demonstrated.

A solution of 0.3 parts Desmodur N-100 aliphatic triisocyanate, 0.4 parts acrylic polyol hydroxy equivalent weight 600, (Joncryl ™ 587, Johnson & Johnson), 1.6 parts methyl ethyl ketone, and 0.03 parts (eta⁵-cyclopentadienyl)(eta⁶-naphthalene)iron(+1) hexafluorophosphate was coated onto an Alodined brand Q panel using a #22 wire wound bar and covered with poly(vinylidene chloride)-primed polyester film. The construction was exposed through a sensitivity guide for two minutes in a 3M Model 70 overhead maker, after which the sample was placed in an oven at 140° C. for 30 seconds. The polyester was removed, and the image was developed by rubbing with a paper wipe wet with methyl ethyl ketone. A negative image was left with 11 solid steps.

Various modifications and alterations of this invention will become apparent to those skilled in the art without departing from the scope and spirit of this invention, and it should be understood that this invention is not to be unduly limited to the illustrative embodiments set forth herein.

We claim:

1. An energy polymerizable composition comprising polyurethane precursors and a catalytically effective amount of an ionic salt of an organometallic complex cation, the metal in said organometallic complex cation being selected from elements of Periodic Groups IVB, VB, VIB, VIIB, and VIIIB.

2. The composition according to claim 1 wherein said polyurethane precursor is at least one polyisocyanate and at least one polyol or other isocyanate-reactive group bearing at least two isocyanate-reactive groups.

3. The composition according to claim 1 wherein said ionic salt has the formula:

$$[((L^1)(L^2)M)_b(L^3)(L^4)]^{+e} X_f \qquad \text{I}$$

wherein
M represents the same or different metal selected from the elements of Periodic Groups IVB, VB, VIB, VIIB, and VIIIB;
with the proviso that Formula I can represent a mononuclear or binuclear complex compound;
$L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;
$L^2$ represent none or 1 to 6 ligands contributing an even number of sigma-electrons that can be the same or different selected from mono-, di-, and tri-dentate ligands, each contributing 2, 4, or 6 sigma-electrons to the valence shell of M;
$L^3$ represents none, 1 or 2 bridging ligands having pi-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 2 to 24 pi-electrons to the valence shells of two metal atoms simultaneously;
$L^4$ represents none, 1, 2 or 3 bridging ligands contributing an even number of sigma-electrons that can be the same or different selected from mono, di, and tri-dentate ligands, each donating 2, 4, or 6 sigma-electrons to the valence shells of two M simultaneously;
with the proviso that the total electronic charge contributed to M by the ligands $L^1$, $L^2$, $L^3$ and $L^4$ plus the product of ionic charge on M with b results in a residual net positive charge of e to the complex;
b is an integer having a value of 1 or 2;
e is an integer having a value of 1 or 2, the residual electrical charge of the complex cation;
X is an anion selected from organic sulfonate anions and halogen-containing complex anions of a metal or metalliod;

f is an integer of 1 or 2, the number of anions required to neutralize the charge e on the complex cation.

4. The composition according to claim 3 wherein the ligand $L^1$ is provided by a monomeric or polymeric compound having an accessible unsaturated group, and contains less than 100 carbon atoms and up to 10 hetero atoms selected from the group consisting of nitrogen, sulfur, non-peroxidic oxygen, phosphorus, arsenic, selenium, antimony, tellurium, silicon, germanium, tin, and boron, ligand $L^2$ is selected from:
  a. monodentate ligands having up to 30 carbon atoms and up to 10 hetero atoms selected from the group consisting of nitrogen, sulfur, non-peroxidic oxygen, phosphorus, arsenic, selenium, antimony, tellurium, and
  b. polydentate ligands capable of forming with metal M a 4-, 5-, or 6-membered saturated or unsaturated ring containing up to 30 carbon atoms and up to 10 hetero atoms selected from the group consisting of nitrogen sulfur, non-peroxidic oxygen, phosphorus, arsenic, selenium, antimony, tellurium, in addition to the metal atom;

the ligand $L^3$ of the ionic salt each is provided by a monomeric or polymeric compound, has an accessible unsaturated group and has up to 30 carbon atoms and up to 10 hetero atoms selected from the group consisting of nitrogen, sulfur, non-peroxidic oxygen, phosphorus, arsenic, selenium, antimony, tellurium, silicon, germanium, tin, and boron;

the bridging ligand $L^4$ of the ionic salt is provided by monodentate and polydentate compound which contains less than 100 carbon atoms and up to 10 hetero atoms selected from the group consisting of nitrogen, sulfur, non-peroxidic oxygen, nitrogen, phosphorus, arsenic, selenium, antimony and tellurium.

5. The composition according to claim 4 wherein the ligand $L^1$ is substituted by a group selected from the group consisting of hydrocarbyl, hydrocarbyloxy, hydrocarbylmercapto, hydrocarbylcarbonyloxy, hydrocarbylcarbonyl, hydrocarbylcarbonamido, azo, boryl, halo, hydroxy, cyano, nitro, nitroso, oxo, dimethylamino, diphenylphosphino, diphenylarsino, diphenylstibine, tributyltin, methylseleno, ethyltelluro, trimethylsiloxy, and condensed rings, said group containing up to 30 carbon atoms and up to 10 hetero atoms selected from the group consisting of nitrogen, sulfur, non-peroxidic oxygen, nitrogen, sulfur, oxygen, phosphorus, arsenic, selenium, antimony, tellurium, silicon, germanium, tin, and boron.

6. The composition according to claim 1 which is at least one of radiation and thermally sensitive.

7. The composition according to claim 1 wherein said ionic salt has the formula:

$$[(L^5)(L^6)M]^{+e}X_f \quad \text{II}$$

wherein
M represents a metal selected from the group consisting of elements of the Periodic Groups IVB, VB, VIB, VIIB, and VIIIB;
$L^5$ represents none, one, or two pi-electron contributing ligands that can be the same or different ligand selected from the same groups of ligands as $L^1$ of formula I;
$L^6$ represents none or 1 to 6 ligands that can be the same or different ligand, contributing an even number of sigma-electrons selected from the same groups of ligands as $L^2$ of formula I;

with the proviso that the total electronic charge contributed to M by $L^5$ and $L^6$ plus the ionic charge on M results in a residual net positive charge of e to the complex; and e, f, and X have the same definition as defined in claim 3.

8. The composition according to claim 5 wherein ligand $L^5$ of the ionic salt contains less than 100 carbon atoms and up to 10 hetero atoms selected from the group consisting of nitrogen, sulfur, non-peroxidic oxygen, phosphorus, arsenic, selenium, antimony, tellunium, silicon, germanium, tin, and boron;

ligand $L^6$ of the ionic salt is selected from:
  a. monodentate ligands having up to 30 carbon atoms and up to 10 hetero atoms selected from the group consisting of nitrogen, sulfur, oxygen, phosphorus, arsenic, selenium, antimony, and tellurium, and
  b. polydentate ligands capable of forming with metal M a 4-, 5-, or 6-membered saturated or unsaturated ring containing up to 30 carbon atoms and up to 10 hetero atoms selected from the group consisting of nitrogen, sulfur, non-peroxidic oxygen, phosphorus, arsenic, selenium, antimony, and tellurium.

9. The composition according to claim 8 wherein ligand $L^5$ is substituted by a group selected from hydrocarbyl, hydrocarbyloxy, hydrocarbylmercapto, hydrocarbyloxycaroonyl, hydrocarbylcarbonyl, hydrocarbylcarbonimido, phenyl, azo, boryl, halo, hydroxy, cyano, nitro, nitroso, oxo, dimethylamino, diphenylphosphino. diphenylarsino, diphenylstibine, tributyltin, methylseleno, ethylselluro, trimethylsiloxy, and condensed rings, said group containing up to 30 carbon toms and up to 10 netero atoms selected from the group consisting of nitrogen, sulfur, non-peroxidic oxygen, phosphorus, arsenic, selenium, antimony, tellurium, silicon, germanium, tin, and boron.

10. The composition according to claim 7 which is at least one of radiation and thermally sensitive.

11. The composition according to claim 1, wherein said salt is present in an amount sufficient to effect polymerization.

12. The composition according to claim 11 wherein said salt is present in an amount in the range of 0.01 to 20 weight percent of said polymerizable composition.

13. The composition according to claim 11 wherein said salt is present in an amount in the range of 0.1 to 5.0 weight percent of said polymerizable composition.

14. The composition according to claim 11 wherein said salt is present in an amount in the range of 0.5 to 2.0 weight percent of said polymerizable composition.

15. The composition according to claim 6 which has been subjected to sufficient energy to effect polymerization and provide a cured composition.

16. The composition according to claim 1 wherein said di- or polyisocyanate is an aliphatic, cycloaliphatic, aralphatic, aromatic, or heterocyclic polyisocyanate, or any combination thereof.

17. The composition according to claim 16 wherein said di or polyisocyanate has the formula $$Q(NCO)_n$$

wherein
n = an integer 2 to 4 and
Q = represents an aliphatic hydrocarbon radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 6 to 15 carbon atoms and zero to 10 heteroatoms, or an araliphatic hydrocarbon radical containing from 8 to 100 carbon atoms and zero to 50 heteroatoms, wherein the heteroatoms in all of the radicals are selected from the group consisting of non-peroxidic oxygen, sulfur, non-amino nitrogen, halogen, silicon, and non-phosphine phosphorus.

18. The composition according to claim 2 wherein said isocyanate-reactive compound contains hydroxyl, thiol, amino, or carboxyl groups.

19. The composition according to claim 1 wherein said ionic salt contains iron or manganese.

20. The composition according to claim 1 further comprising in the range of 0.01 to 10 parts by weight of a photosensitizer or photoaccelerator per part of organometallic salt.

21. A process of polymerizing polyurethane precursor composition comprising the steps of:
   a. admixing said polyurethane precursor composition with a catalytically effective amount of an ionic salt of an organometallic complex cation, the metal in said organometallic complex being selected from the group consisting of elements of Periodic Groups IVB, VB, VIB, VIIB, VIIIB, and
   b. curing the resulting admixture with at least one of a thermal or actinic radiation source.

22. The process according to claim 21 wherein said curing is a two-stage process comprising the sequential steps of:
   a. irradiating said composition to activate said ionic salt, and
   b. heating the activated composition.

23. An article comprising the composition according to claim 1.

24. An article comprising the composition according to claim 21.

25. The article according to claim 24 which is a photoresist, a layered structure, a shaped article, or a foamed article.

* * * * *

UNITED STATES PATENT AND TRADEMARK OFFICE
CERTIFICATE OF CORRECTION

PATENT NO. : 4,740,577                                       Page 1 of 2

DATED      : April 26, 1988

INVENTOR(S): DeVoe et al.

It is certified that error appears in the above-identified patent and that said Letters Patent is hereby corrected as shown below:

Col. 10, line 37, "etas" should be -- $eta^5$ --.

Col. 12, line 38, "(EPO Offenlichungonummer No. 0094914)" should read -- , EPO No. 094914 --.

Col. 13, line 3, "1-isocyanate" should read -- 1-isocyanato --.

Col. 23, line 26, "Alodinedu" should read -- Alodined$^{TM}$ --.

Col. 24, line 33, "mixute" should read -- mixture --.

Claim 9, col. 28, lines 25-26, "hydrocarbyloxy-caroonyl" should read -- hydrocarbyloxycarbonyl --.

Claim 9, col. 28, lines 26-27, "hydrocarbyl-carbonimido" should read -- hydrocarbylcarbonamido --.

UNITED STATES PATENT AND TRADEMARK OFFICE
CERTIFICATE OF CORRECTION

PATENT NO. : 4,740,577

DATED : April 26, 1988

INVENTOR(S) : DeVoe et al.

It is certified that error appears in the above-identified patent and that said Letters Patent is hereby corrected as shown below:

Claim 9, col. 28, line 32, "toms" should read -- atoms --.

Claim 9, col. 28, line 32, "netero" should read -- hetero --.

Signed and Sealed this

Thirty-first Day of January, 1989

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,740,577
DATED : April 26, 1988
INVENTOR(S) : DeVoe et al.

It is certified that error appears in the above-identified patent and that said Letters Patent is hereby corrected as shown below:

Face Sheet of the Patent, under Section [56] References Cited, Foreign Patent Documents, the following reference should be added:

-- 094915  5/1983  European Pat. Off. --

Signed and Sealed this

Fourteenth Day of March, 1989

Attest:

DONALD J. QUIGG

Attesting Officer

Commissioner of Patents and Trademarks